United States Patent
O'Toole et al.

(10) Patent No.: US 7,702,327 B2
(45) Date of Patent: Apr. 20, 2010

(54) WIRELESS CONTROL FOR CREATION OF, AND COMMAND RESPONSE TO, STANDARD FREIGHT SHIPMENT MESSAGES

(75) Inventors: Arthur J. O'Toole, Fredon, NJ (US); Thomas A. Robinson, Mendham, NJ (US)

(73) Assignee: StarTrak Systems, LLC, Morris Plains, NJ (US)

( * ) Notice: Subject to any disclaimer, the term of this patent is extended or adjusted under 35 U.S.C. 154(b) by 660 days.

(21) Appl. No.: 10/562,402

(22) PCT Filed: Jun. 24, 2004

(86) PCT No.: PCT/US2004/020503
§ 371 (c)(1),
(2), (4) Date: Feb. 28, 2007

(87) PCT Pub. No.: WO2005/002125
PCT Pub. Date: Jan. 6, 2005

(65) Prior Publication Data
US 2007/0200687 A1 Aug. 30, 2007

Related U.S. Application Data

(60) Provisional application No. 60/480,980, filed on Jun. 24, 2003, provisional application No. 60/482,889, filed on Jun. 26, 2003, provisional application No. 60/582,258, filed on Jun. 23, 2004.

(51) Int. Cl.
*H04W 24/00* (2009.01)
*B60R 25/10* (2006.01)
*G06F 11/00* (2006.01)

(52) U.S. Cl. ............... 455/423; 340/426.2; 702/188
(58) Field of Classification Search .......... 455/423
See application file for complete search history.

(56) References Cited

U.S. PATENT DOCUMENTS

| | | | |
|---|---|---|---|
| 4,750,197 A | 6/1988 | Denekamp et al. | |
| 4,897,642 A | 1/1990 | DiLullo et al. | |
| 5,969,595 A | 10/1999 | Schipper et al. | |
| 5,999,091 A * | 12/1999 | Wortham | 340/431 |
| 6,421,354 B1 | 7/2002 | Godlewski | |
| 6,865,516 B1* | 3/2005 | Richardson | 702/188 |
| 7,046,985 B2* | 5/2006 | Seales et al. | 455/404.1 |
| 2002/0111819 A1* | 8/2002 | Li et al. | 705/1 |
| 2003/0069648 A1* | 4/2003 | Douglas et al. | 700/2 |
| 2003/0179073 A1* | 9/2003 | Ghazarian | 340/5.6 |

OTHER PUBLICATIONS

Publisher: www.x12.org Title: Data Elements Version 5 Proof X12JTV Truck, VanTW Trailer, Refrigerated A refrigerated trailer capable of keeping product cold. Date: Sep. 2002 Pertinet p. 94.*

* cited by examiner

*Primary Examiner*—Lester Kincaid
*Assistant Examiner*—Yu (Andy) Gu
(74) *Attorney, Agent, or Firm*—Leo Stanger

(57) ABSTRACT

In a freight management system a translator in a monitor system receives and transmits data in standard freight message format from and to a number of users, as well as in a variety of wireless formats to and from freight assets, and automatically in real time translates between the formats. The translator receives sensed data from the freight assets and transmits the translated data to the respective users while transmitting commands in wireless format to the freight assets on the basis of data received in standard freight message format.

18 Claims, 4 Drawing Sheets

U.S. 7,702,327 B2

1

WIRELESS CONTROL FOR CREATION OF, AND COMMAND RESPONSE TO, STANDARD FREIGHT SHIPMENT MESSAGES

This application claims the benefit of the following copending applications and their filing dates: U.S. 60/480,980 filed 24 May 2003; U.S. 60/582,258 file 23 Jun. 2004; and U.S. 60/482,889 file 26 Jun. 2003.

FIELD OF THE INVENTION

This invention relates to remote control of freight assets during transit or other states.

BACKGROUND OF THE INVENTION

Condition of freight assets such as refrigeration temperatures, locations, etc, have in the past been detected by sensors, and various alarms and signals alerted attendants and managers of adverse conditions. Such systems have been cumbersome and presented difficulties for remote managers and attendants because of limitations of the communication systems.

SUMMARY OF THE INVENTION

An embodiment of the invention involves transmitting sensed conditions of freight assets via one format suitable for the sensors to a monitoring system, which sends the data to a user utilizing another, user compatible, format.

Another embodiment involves the monitoring system comparing the sensed conditions with requirements from a user and sending the discrepancy to the user.

Another embodiment involves the monitoring system commanding devices of the freight asset to correct discrepancies.

These and other aspects of the invention are pointed out in the claims. Objects and advantages of the invention will become evident from the following detailed description when read in light of the accompanying drawings.

DETAILED DESCRIPTION OF PREFERRED EMBODIMENTS

Figure 1:
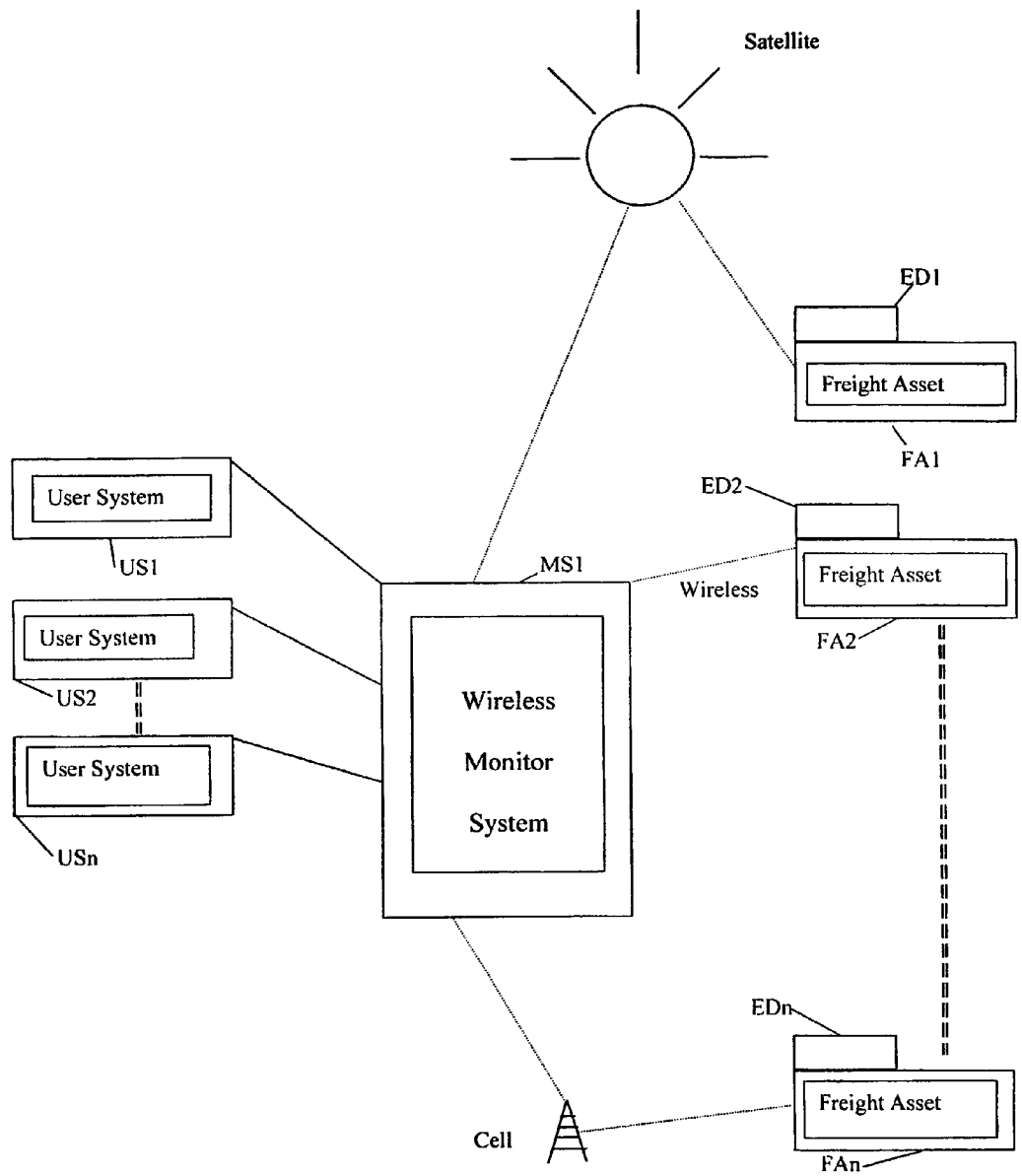
FIG. 1 is a general schematic diagram illustrating an overall system embodying the invention.

FIG. 1 is a schematic illustration of an over all system embodying the invention. Here, a multiplicity of users US1, US2, ... USn connect over respective communication links to a wireless monitor system MS1. There may for example be one hundred users so that the character n represents one hundred. The communication links are preferably wire or cable but can also be wireless, internet, satellite, or other communication paths.

The wireless monitor system MS1 communicates over various communication links such as satellite, cell phone, radio, etc. with fleets of freight assets FA1, FA2, ... FAn. The number of freight assets FA1, FA2, ... FAn may for example be one thousand for each user US1, US2, ... USn, for a total one hundred thousand freight assets.

The wireless monitoring system MS1 responds to signals from the users US1, US2, ... USn, and in turn sends signals to the users, and also communicates with the freight assets FA1, FA2, ... FAn to furnish wireless monitoring and tracking of the freight assets. The wireless monitoring system MS1 provides services to the multiple users simultaneously and retains database information regarding a fleet of freight assets associated with each of the users. The wireless monitoring system MS1 serves as a communications platform for sending polling inquires to the individual freight assets FA1, FA2, FAn over the multiple communication networks, such as satellite, cellular, and radio frequency networks. The wireless monitoring system MS1 communicates via EDI standards in multiple communication platforms to a collection of freight assets FA1, FA2, ... FAn for multiple system users. The wireless monitoring system MS1 makes use of the economy of scale for supporting different communications networks in different system users for similar application.

The communications may be carried out over multiple frequencies, using time division multiplexing where desired. The monitoring system MS1 maintains a database which determines the particular ones of the freight assets FA1, FA2, ... FAn that are owned or belong to or are associated with the particular users US1, US2, ... USn. The system MS1 also maintains information concerning the particular event or condition within the freight asset that the user desires to be controlled. Each of the freight assets FA1, FA2, ... FAn includes an intelligent electronic device ED1 that serves to communicate one or more of a number of monitored conditions within the freight assets. Such conditions may for example include any one or more environmental or ambient circumstances such as temperature, location, speed, direction of movement, vibration, load, humidity, ambient gas, illumination, radiation, etc.

This arrangement utilizes wireless intelligence on a freight asset to evaluate status conditions that automatically trigger transmissions and generate industry standard freight industry messages, which may be used for tracking and monitoring of freight assets and shipments. A corollary of the invention utilizes industry standard freight shipment messages that are evaluated against wireless messages transmitted from a freight asset with wireless intelligence to send command actions to the asset, which change or alter a monitored freight condition. Another corollary involves a method that permits a user to create an industry standard freight message by sending a wireless notification to an asset, which responds to the notification with a wireless transmission, and results in an industry standard freight message.

Figure 2:
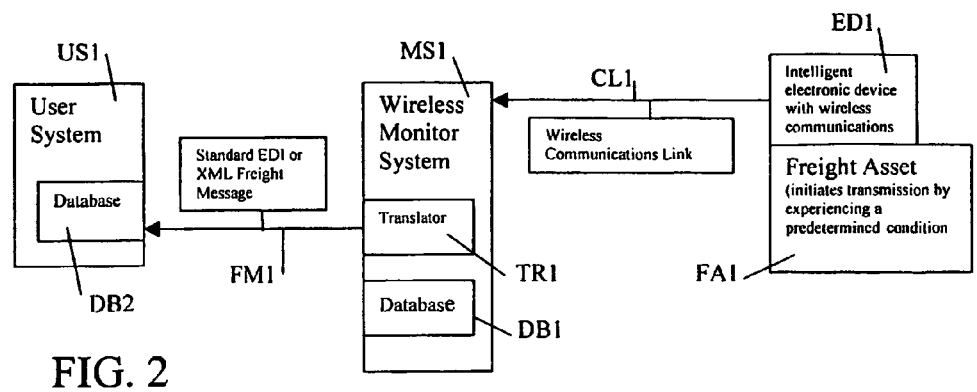
FIG. 2 is a schematic illustration of one embodiment of the invention.

A detailed embodiment of the invention appears in FIG. 2. Here, a specialized aspect of this invention involves a particular condition of a freight asset FA1, monitored in real-time, which creates an alarm or event condition concerning the asset within an intelligent electronic device ED1, by virtue of the intelligence of that device. The freight asset FA1 may be any one or more conveyances such as a truck, tractor, bus, railroad car, ship, boat, and their contents, and also include any one or more of warehouses or storage facilities and their contents. The monitored condition includes any one or more of environmental or ambient circumstances such as temperature, location, speed, direction of movement, vibration, load, humidity, ambient gas, illumination, radiation, etc. The alarm or event condition is sent via an encoded wireless communications link CL1 to a wireless monitor system MS1 having a database DB1. The wireless monitor system may be a ground based receiving and transmitting service station or facility with both wireless and groundline, such as wire, cable, optical fiber, etc. communication ability. The wireless message from the electronic device ED1 is encoded particularly for the bandwidth restrictions of the wireless communication link CL1. The wireless message may be communicated by radio waves, satellite, microwaves, laser, etc. The wireless monitor system MS1 receives the wireless freight message FM1 and contains a translator TR1 that formats the message into an industry standard user format, such as Electronic Data Exchange (EDI) or Extensible Mark-up Language (XML) freight message FM1 containing relevant information regarding the asset. The translator TR1 transmits the message FM1 in the user format to users at a user system US1 having information systems that accommodate the standard user format message types such as EDI or XML, and have a database DB2. The user system may be the headquarters or communication center, or executive office of a user whose managers require the information for their operation. This process permits the intelligent electronic device ED1 of the monitoring system on the freight asset FA1 to transmit standard, "open systems" messages, which are delivered into the existing information systems of user's of freight equipment.

The device ED1 on the asset FA1 automatically evaluates a particular condition to provide information that is normally derived from other sources (i.e. wayside monitoring systems that tell when an asset passes by and human creation of events that occur at under specific conditions). One example of this embodiment of the invention involves the local knowledge of location of the asset FA1, by use of a geographic positioning system (gps) sensor or equivalent, when the asset FA1 moved into a user designated location, where the asset FA1 would generate a wireless message, formatted into an industry standard message by the translator TR1 for delivery into the user system US1 and its database DB2. The newly formatted message from the translator TR1 contains information delivered from the asset FA1, including for example, gps location, time of arrival or departure, and the condition of the freight (door position, temperature, set point temperature, presence of auxiliary equipment, etc.).

Another example of this process involves a laborer changing the temperature set point on the asset FA1, such as a refrigerated trailer or railcar, which causes the device ED1 to generate an encoded wireless message that the translator TR1 ultimately delivers as a standard industry message FM1 to the user at user system US1 with its database DB2. With these given messages, the user may compare the wireless generated information from equipment located on the asset to shipping records and provide immediate context to the shipment without the need for local reading devices or operator inputs. FIG. 2 illustrates steps in the operation.

Figure 4:
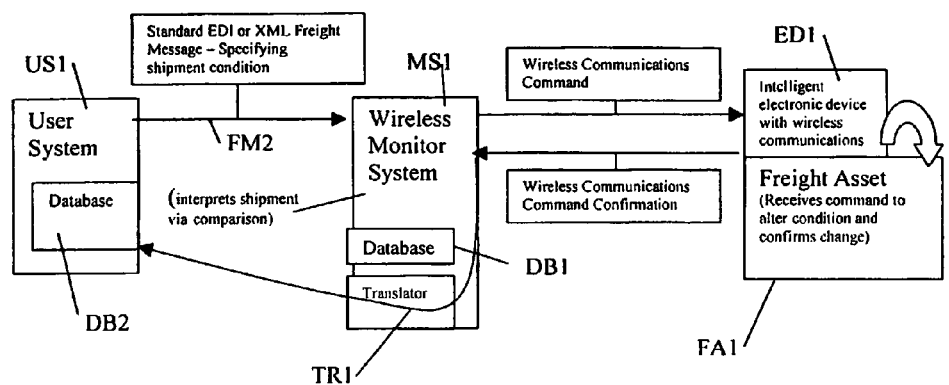
FIG. 4 is a schematic illustration of another embodiment of the invention.
Figure 5:
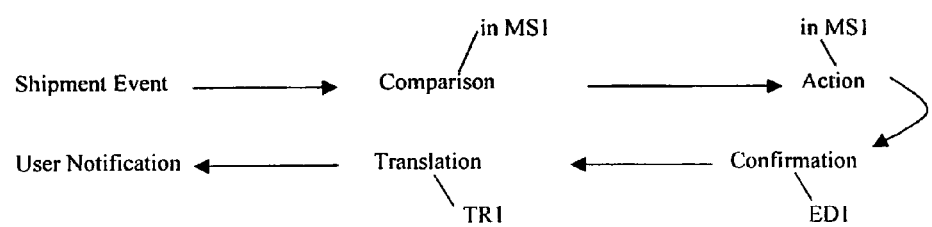
FIG. 5 is a representation showing the operation of FIG. 4.

Another embodiment appears in FIGS. 4 and 5. This involves the generation of a wireless command by the monitor system MS1 to the asset FA1 to change a condition based on a discrepancy between an industry standard freight message FM2 and information transmitted from the freight asset FA1 using encoded wireless communications via the device ED1. Upon the receipt of the industry standard freight message FM2 generated by the user system US1 with its database DB2 specific to an individual freight asset FA1, the monitor system MS1 compares recent encoded wireless messages from the asset FA1 via the electronic device ED1 to the newly received freight message FM2. Should an exception occur resulting from a discrepancy between the originating freight message FM2 and the encoded wireless message, which involve a specification for the freight shipment, such as a destination, temperature setting, routing violation, and recent wireless messages, then the monitor system MS1 sends a wireless command to the intelligent electronic device ED1 on the asset FA1, which changes the condition of the asset FA1. In one example, a user sends an industry standard freight message FM2, via the database DB2 to the monitor system MS1, specifying a specific temperature setting for a commodity contained within a specific freight asset FA1, and the temperature setting is compared to, and found different from, a recently received actual temperature setting received via encoded wireless communications from the asset FA1 via the device ED1. Then an automatic command is sent to the intelligent electronic device ED1 instructing it to change the temperature set point to the newly prescribed temperature setting of the message FM2. Upon enacting the change in temperature, the electronic device ED1 sends an encoded wireless message confirming that the action took place. The translator TR1 in turn forwards this message in an industry standard freight message EDI or XML. Another example involves the automatic sending of a command to a unit to lock the freight doors once the asset has left a prescribed location delivered to the monitor system MS1 via an industry standard message.

Figure 6:
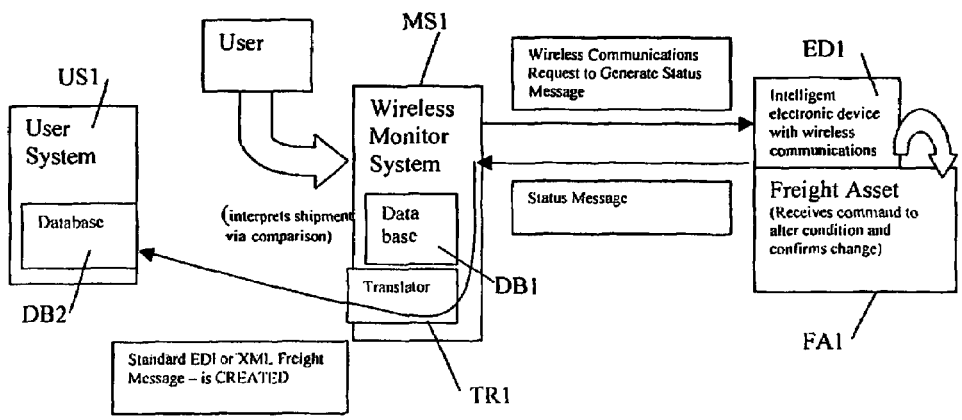
FIG. 6 is a schematic illustration of yet another embodiment of the invention.
Figure 7:
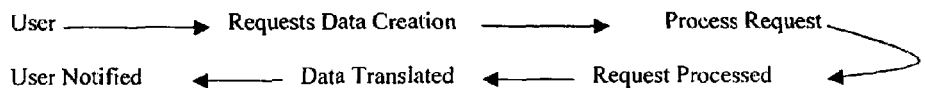
FIG. 7 is a representation showing the operation of FIG. 6.

Yet another embodiment appears in FIGS. 6 and 7. This involves a method to create a standard freight industry message by accessing a monitor system MS1 and sending a command via wireless communications to an intelligent device attached to a freight asset. Upon receipt of the command from the user via monitor system MS1, the intelligent device ED1 creates a transmission that results in an industry standard freight message in a method similar to the embodiments above.

Figure 3:
FIG. 3 is a representation showing the operation of FIG. 2.

In these embodiments, the standard freight messages FM1 involve, for example, bills of lading (404), waybills (417), Terminal Operations and Intermodal Ramp Activity (322) messages and car location messages, which contain relevant information about freight shipments. These messages, and related messages, are created from encoded wireless messages via satellite, cellular or radio frequency communications in the first embodiment, FIGS. 2 and 3. In an embodiment, these messages, and related messages, specify the actual conditions of the freight, and the wireless communications links assure, via control mechanisms, that the freight shipment meets the specification.

The invention permits real time transmission of freight asset conditions, freight control signals, and confirmation signals between wireless, e.g. satellite, transmission formats and standard message formats EDI or XML.

The database DB1 stores all incoming and outgoing messages to and from the wireless monitor system MS1. If the monitor system MS1 receives a message from the user system US1 with its database DB2 to alter the status of the freight asset FA1, the database DB1 stores the command as the translator TR1 transmits the message to the electronic device ED1. When the latter effects the requested change in the status of the freight asset FA1, it sends back a confirmation to the monitor system MS1 which compares the resulting change with the command stored in the database DB1 to assure compliance. The translator TR1 the sends the result via standard message formats EDI or XML to the user system US1 with its database DB2.

The database DB1 also stores contact information for alarms, as well as user preferences. The user may for example be a freight forwarding company, a railroad company, a truck company, a refrigeration company, etc.

The term freight assets may refer to a freight cars, motor trucks, the freight carried, their temperatures, destinations, and/or other conditions of operations. The freight assets can also include freight equipment, and its weights, loads, and pressures.

In FIG. 6 the user may address the wireless monitor system MS1 directly by telephone, e-mail, or web-address, etc.

The electronic device ED1 may from part of the freight assets FA1, FA2, . . . FAn, and may vary in the form from freight asset to freight asset.

While embodiments of the invention have been described in detail it will be evident to those skilled in the art that the invention may be embodied otherwise.

What is claimed is:

1. A freight management method, comprising sensing a condition on a freight asset;
    transmitting the information concerning the sensed condition over a wireless system to a monitor system in one format;
    in the monitor system translating the information concerning the sensed condition from the one format into a second format;
    transmitting the information concerning the sensed condition from the monitor system in the second format to a user capable of receiving in the second format;
    the step of sensing the condition on the freight asset includes monitoring the sensed condition automatically and in real time;
    the step of transmitting the information concerning the sensed condition to the monitor system includes automatically responding to the condition in real time;
    the step of translating the information concerning the sensed condition from the first format to the second format including converting open system messages into existing industry standard freight messages;
    the step of loading pre-determined conditions and trigger events with a translator in the monitor system onto a sensor on a freight asset, said conditions corresponding to the standard conditions transmitted to the translator and contained within standard freight messages, including designated locations, set point temperature and presence of auxiliary equipment;
    whereby said standard freight message provides immediate context for the user.

2. A freight management method as in claim 1, further comprising
    said freight asset being a first freight asset, said user being a first user, said condition being a first condition;
    automatically sensing a second condition on a second freight asset associated with a second user in real time;
    automatically transmitting information concerning the second sensed condition over the wireless system to the monitor system in an open system message format;
    translating the information concerning second conditions from respective open system messages into an industry standard freight message format;
    transmitting the information concerning the second sensed condition from the monitor system to said second user the format of industry standard freight messages;
    said first and second freight asset together constituting a plurality of freight assets; said first and second conditions constituting a plurality of conditions, and said first and second users constituting a plurality of users;
    said step of transmitting the information concerning the plurality of sensed conditions over a wireless system to the monitor system includes responding to trigger conditions derived from one of user designated locations, destination areas, and freight operational settings and conditions on the plurality of freight assets.

3. A freight management method as in claim 2, further comprising:
    transmitting to said monitor system from the respective plurality of users industry standard freight messages of respective plurality of predetermined conditions for respective ones of said plurality of freight assets;
    in the monitor system comparing of the information concerning the plurality of sensed conditions transmitted over the wireless system with respective ones of a plurality of predetermined conditions specified within standard freight shipment messages, to notify the plurality of users of respective disparities with the predetermined conditions and provide status updates in the standard freight shipment message of the plurality of users; and
    automatically transmitting via the wireless system respective change commands to the actual condition on the plurality of freight assets to conform to the condition specified in the respective user's standard freight shipment message.

4. A freight management method as in claim 1, wherein:
    a translator in the monitor system compares information transmitted by user predetermined conditions specified within industry standard freight message format with corresponding information concerning the condition transmitted via wireless communications from a remote monitoring device attached to a freight asset;
    the specified information containing one of a user designated location, a commodity's pre-determined temperature set point setting, an arrival notification, a departure notification, attachment of auxiliary power equipment, in the format a user within the freight shipment documentation;
    causing said translator to reconcile events derived from wireless communications directly in the format contained in the freight message of GPS coordinates to a "named area or location" in a standard shipping document, thereby allowing a specific sensor reading to be directly applied through the entire monitoring, communication and network path to create notifications that the documented shipment condition is initiated, satisfied or terminated.

5. A freight management method as in claim 2, wherein:
    automatically transmitting the information concerning the sensed conditions over a wireless system to the monitor system by extracting relevant information from standard freight shipment messages and delivering predetermined conditions via the use of a translator.

6. A freight management method as in claim 1, wherein:
    transmitting the information concerning the sensed conditions over a wireless system to the monitor system includes wireless notification transmissions of events in real-time from a freight asset, based on pre-determined conditions identified in a standard freight message to the monitor, and
    translating information and the messages of the transmission of an event for tracking and monitoring of freight assets.

7. A freight management method as in claim 2, wherein:
    transmitting the information concerning the sensed condition over a wireless system to a monitor system includes wireless notification transmission events in real-time in real-time from a freight asset, based on pre-determined conditions identified in a standard freight message, and, by transmission to and from a translator in the monitor system, associating the transmission with a meaningful event to be used for tracking and monitoring of a commodity transported in a freight shipment.

8. A freight management method as in claim 1, further comprising:
in said monitor system evaluating information about freight shipments, contained within standard freight messages, including one of terminal operations and intermodal ramp activities and related activities within the sensors,
from said plurality of freight assets automatically triggering and communicating in real time via a wireless system status notifications from entry of the sensor into an area governed by GPS coordinates on an intelligent device, pre-determined by designated locations in the users's systems, corresponding to the users' designated location, delivered in the second format to the user's freight system in real-time.

9. A freight management method as in claim 2, further comprising:
automatically transmitting specific information contained in standard freight messages to a translator in the monitor system and from the translator to automatically evaluate prescribed and pre-determined shipment conditions to actual shipment conditions communicated by wireless communications, including a prescribed temperature set point setting for a commodity identified in the standard freight messages of refrigerated transport equipment.

10. A freight management method as in claim 2, further comprising:
automatically comparing of weight of a load of a freight asset in one of the monitoring systems and the weight specified by a user by comparison in a translator in the monitor system.

11. A freight management method as in claim 1, further comprising:
evaluating messages initiated by a sensor at one of terminal operations and intermodal ramp activity, and freight asset location messages and related status messages, triggered by a change in a critical condition and transmitting to the translator and from the translator to allow immediate exception reporting in one of a monitoring system or a user system.

12. A freight management method as in claim 2, further comprising:
evaluating pre-determined information concerning the plurality of conditions contained in standard freight messages, including one of bills of lading and waybills, to compare pre-determined shipment conditions, including a set point temperature of a commodity within a freight asset, and automatically sending commands to an intelligent device including the sensor on the freight asset to change the condition, including the set point temperature, to be compliant with the pre-determined condition in the standard freight message appropriate for a commodity on the freight asset;
sending a confirmation notification of a change in a condition at a sensor and confirmation of the actual change to said monitor system and transmitting the confirmation notification from the sensor as a standard freight status message in the format of the user's system to assure compliance to the predetermined condition.

13. A freight management method as in claim 1, further comprising:
transmitting a command to the translator and from the translator to a sensor to lock doors of freight asset when the asset has left a prescribed location contained in the standard freight message.

14. A freight management method as in claim 1, further comprising:
automatically initiating a shipment status message in standard shipment formats, using real-time information from a sensor by transmitting to a translator in the monitor system and from the translator wirelessly.

15. A freight management method as in claim 1, further comprising:
triggering onto a sensor events which correspond terminal operations and intermodal ramp activity and related standard freight messages' relevant status information, by transmitting the sensor events to a translator in the monitor system and from the translator to the users of standard freight information trigger events and corresponding trigger events managed by a sensor.

16. A freight management method as in claim 2, further comprising:
establishing pre-determined conditions and trigger events on a fleet of freight assets associated with a user, and establishing other pre-determined conditions and trigger events on an entirely separate fleet associated with another user, on the basis of information in the standard freight shipment messages transmitted to a translator in the monitor system and from the translator to the sensors, including one of lading, waybills, status messages, and location messages.

17. A freight management method as in claim 1, further comprising:
wireless intelligence including the sensor on a freight asset to evaluate status conditions that automatically trigger transmissions, and translating the status conditions into industry standard freight messages, the messages to include EDI and XML-based standard freight shipment messages, including but not limited to EDI 322.

18. A freight management method as in claim 1, further comprising:
mounting intelligent wireless devices and integrating the intelligent wireless devices mounted on freight assets with standard shipment messages communicating relevant shipment conditions in the same format via the translator.

* * * * *